(12) United States Patent
Wang et al.

(10) Patent No.: US 8,245,355 B2
(45) Date of Patent: Aug. 21, 2012

(54) HINGE ASSEMBLY

(75) Inventors: Jin-Xin Wang, Shenzhen (CN);
Lian-Cheng Huang, Shenzhen (CN);
Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 29 days.

(21) Appl. No.: 12/344,664

(22) Filed: Dec. 29, 2008

(65) Prior Publication Data

US 2009/0320240 A1 Dec. 31, 2009

(30) Foreign Application Priority Data

Jun. 27, 2008 (CN) .......................... 2008 1 0302403

(51) Int. Cl.
*E05C 17/64* (2006.01)

(52) U.S. Cl. ........................................................ 16/340

(58) Field of Classification Search .................... 16/340, 16/334
See application file for complete search history.

(56) References Cited

U.S. PATENT DOCUMENTS

| | | | | |
|---|---|---|---|---|
| 6,109,586 A | * | 8/2000 | Hoek ............................ | 248/476 |
| 6,742,756 B1 | * | 6/2004 | Fimeri et al. .................. | 248/479 |
| 7,237,304 B2 | * | 7/2007 | Duan et al. ..................... | 16/324 |
| 7,621,021 B2 | * | 11/2009 | Hsu et al. ....................... | 16/367 |
| 2007/0174996 A1 | * | 8/2007 | Lu et al. .......................... | 16/340 |
| 2007/0180656 A1 | * | 8/2007 | Chen et al. ...................... | 16/340 |
| 2007/0199179 A1 | * | 8/2007 | Wang .............................. | 16/340 |
| 2007/0295211 A1 | * | 12/2007 | Yang .............................. | 95/285 |
| 2009/0271948 A1 | * | 11/2009 | Wang .............................. | 16/340 |

* cited by examiner

*Primary Examiner* — Victor Batson
*Assistant Examiner* — Matthew Sullivan
(74) *Attorney, Agent, or Firm* — Altis Law Group, Inc.

(57) ABSTRACT

A hinge assembly includes a pivot shaft, a first leaf, a fixing leaf, a restricting member, a deformable member, two limiting blocks, and a fastening member. The rotatable leaf is non-rotatably connected to the pivot shaft and the fixing leaf is rotatably connected to the pivot shaft. The restricting member and the deformable member are rotatably sleeved on the pivot shaft. The restricting member defines two positioning grooves. The deformable member includes a base plate and two protrusions extending substantially perpendicularly from the base plate. The limiting blocks are partially received in the positioning grooves and connected to the deformable member. When the rotatable leaf is rotated, the limiting blocks slide out of the positioning grooves to press the base plate of the deformable member such that the deformable member becomes elastically deformed. The fastening member is fixed on an end of the pivot shaft.

20 Claims, 4 Drawing Sheets

HINGE ASSEMBLY

BACKGROUND

1. Technical Field

The present disclosure relates generally to hinge assemblies and, more particularly, to a hinge assembly for a foldable electronic device.

2. Description of the Related Art

Foldable electronic devices, such as notebook computers, are popular for their portability. In the foldable electronic device, a cover is rotatably connected to a main body via a typical hinge assembly.

The typical hinge assembly often includes a shaft, a friction member, a plurality of resilient washers fixed on the shaft, and a rotary member rotatably sleeved on the shaft. The rotary member and the shaft are fixed to the cover and the main body. The resilient washers create an axial force to push the friction member to resist the rotary member. The rotary member may be positioned in any position relative to the friction member and the shaft because of friction created between the friction member and the rotary member. Thus, the cover can be opened to any angle relative to the main body, and remain in any position.

However, the axial force created by the resilient washers is relatively small, and over time, the friction causes abrasion of the engaging surfaces of the rotary member and the friction member, resulting in little or no friction between the rotary member and the friction member. Thus, the cover would be incapable of remaining in any desired position. In addition, the resilient washers are always compressed even when the rotary member is not being rotated, so the resilient washers become worn. Therefore, the hinge assembly has a relatively short usage life.

Therefore, a hinge assembly to solve the aforementioned problems is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
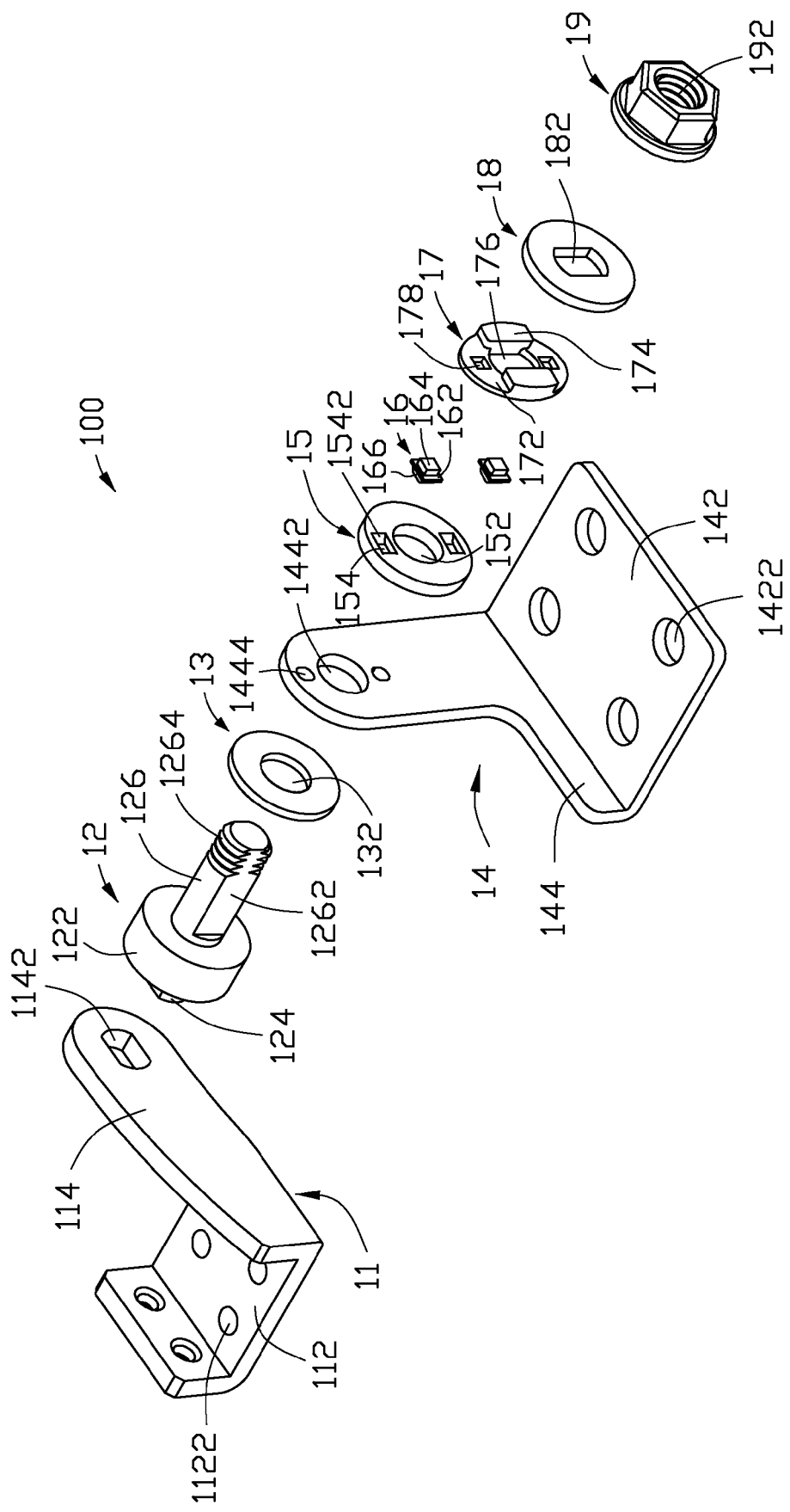
FIG. 1 is an exploded, isometric view of an embodiment of a hinge assembly.
Figure 2:
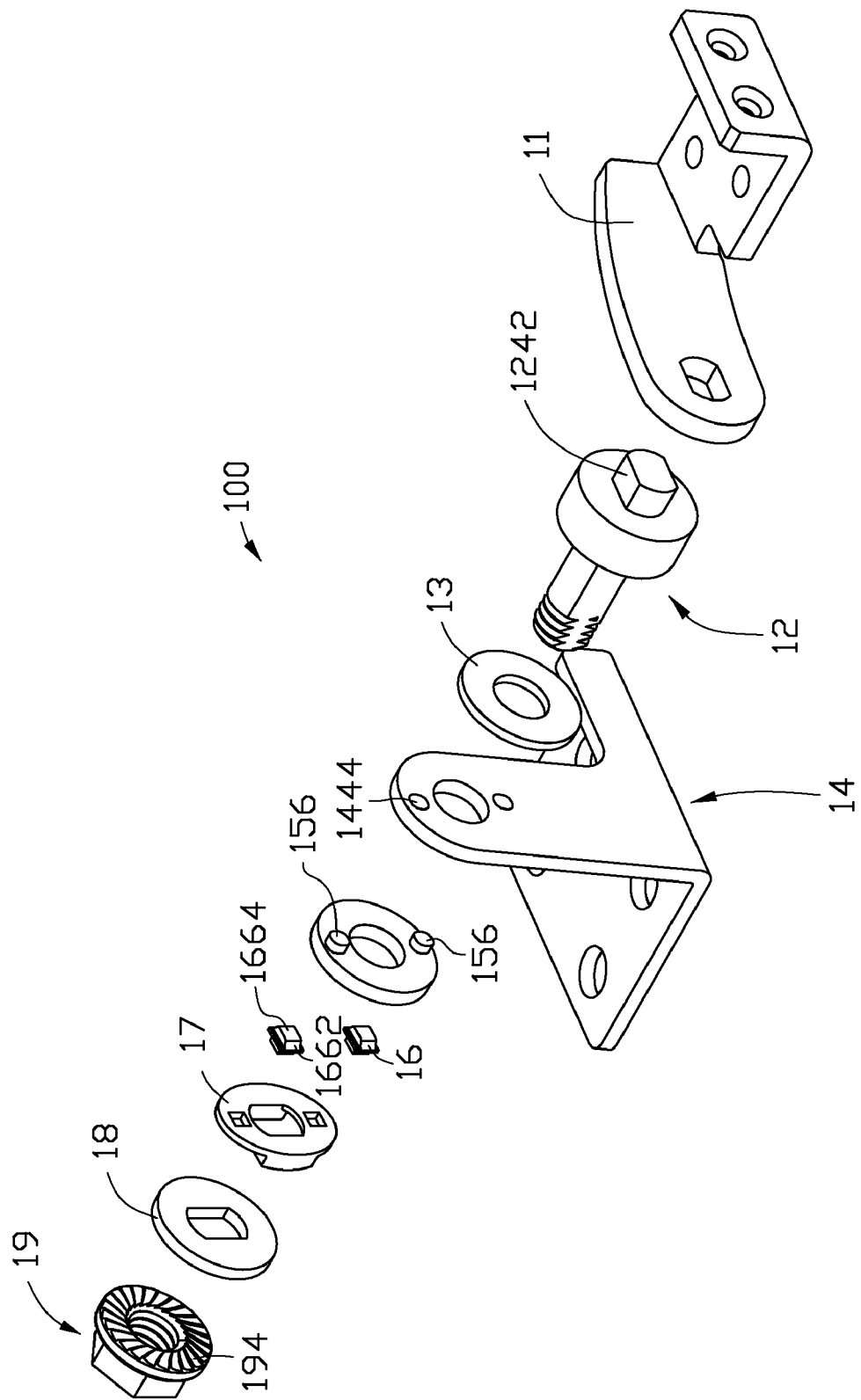
FIG. 2 is similar to FIG. 1, but viewed from another aspect.
Figure 3:
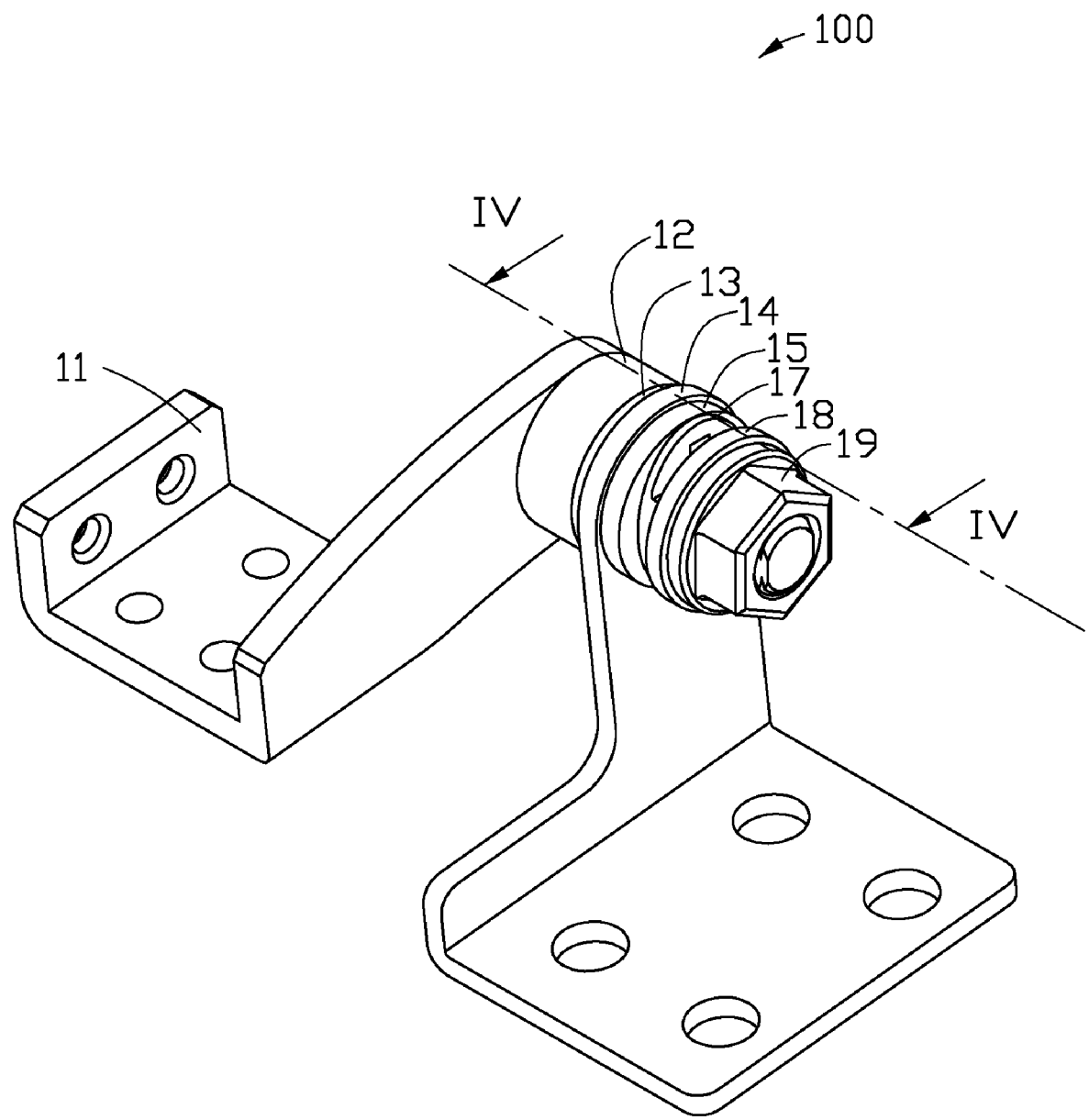
FIG. 3 is an assembled, isometric view of the hinge assembly in FIG. 1.
Figure 4:
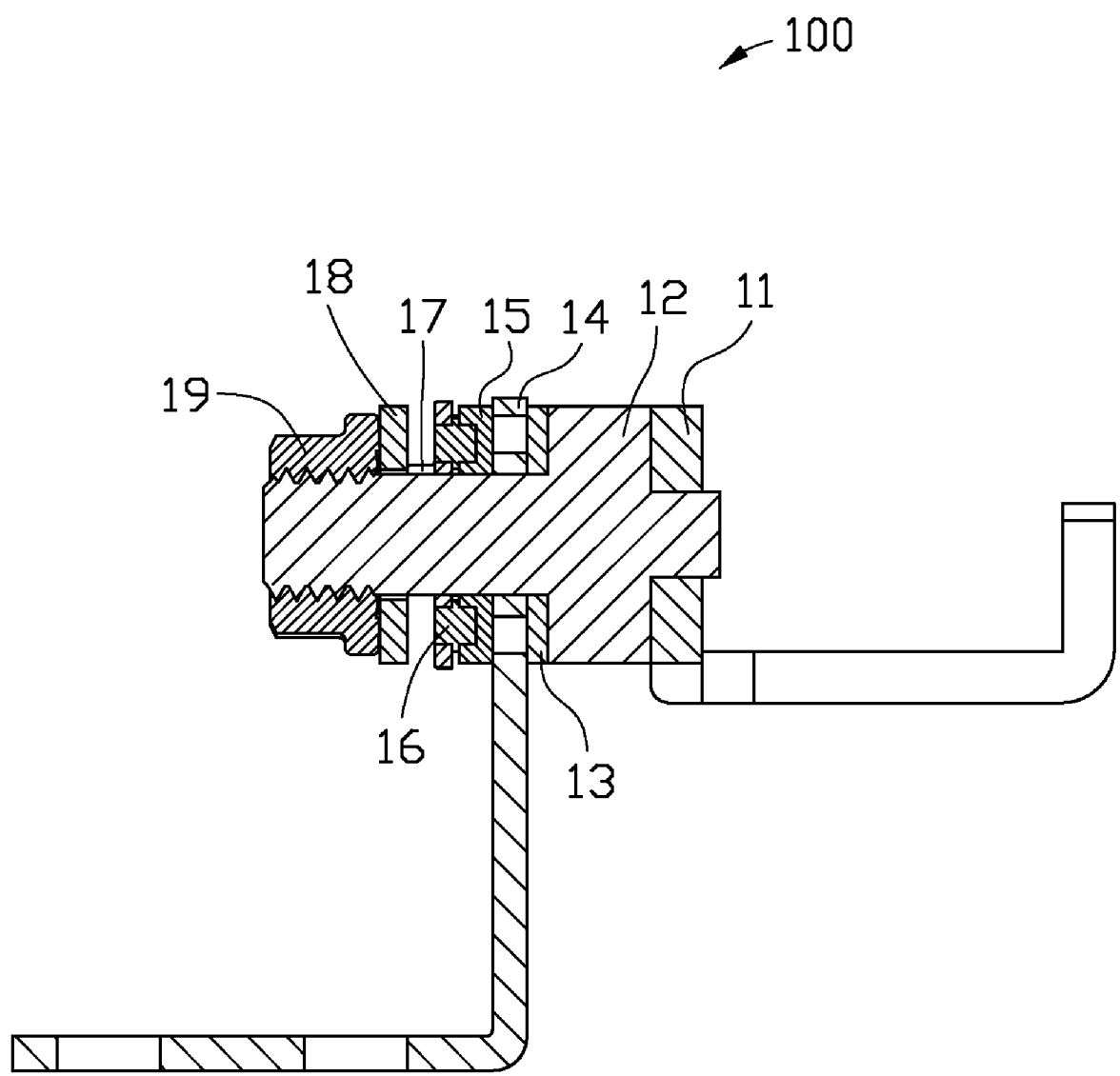
FIG. 4 is a cross-sectional view of the hinge assembly in FIG. 1, taken along line IV-IV.

Referring to FIGS. 1 and 2, an embodiment of a hinge assembly 100 for a foldable electronic device (not shown) includes a rotatable leaf 11, a rotatable pivot shaft 12, a friction member 13, a fixing leaf 14, a restricting member 15, two limiting blocks 16, a deformable member 17, a washer 18, and a fastening member 19.

The rotatable leaf 11 includes a mounting portion 112 and a connecting knuckle 114 substantially perpendicularly extending from a side of the mounting portion 112. The mounting portion 112 defines a plurality of mounting holes 1122 to fix the rotatable leaf 11 to a cover (not shown) of the foldable electronic device. The connecting knuckle 114 defines a non-circular fixing hole 1142.

The pivot shaft 12 includes a flange portion 122, a fixing head 124, and a shaft portion 126. The fixing head 124 and the shaft portion 126 extend from opposite ends of the flange portion 122. The flange portion 122 may be substantially cylindrical shaped. The fixing head 124 includes two substantially parallel flattened surfaces 1242, and a cross-section of the fixing head 124 taken along a plane perpendicular to the central axis of the fixing portion 124 corresponds to the shape of the fixing hole 1142 of the rotatable leaf 11. The shaft portion 126 also includes two substantially parallel flattened surfaces 1262, thus a cross-section of the shaft portion 126 taken along a plane perpendicular to the central axis of the shaft portion 126 may be double-D shaped. A threaded portion 1264 is formed on a distal end of the shaft portion 12 away from the flange portion 122.

The friction member 13 is ring-shaped and a center of the friction member 13 defines a substantially circular through hole 132.

The fixing leaf 14 includes a fixing plate 142 and a supporting plate 144 extending substantially perpendicularly from a side of the fixing plate 142. The fixing plate 142 defines a plurality of fixing holes 1422 to fix the fixing leaf 14 to a main body (not shown) of the foldable electronic device. The supporting plate 144 defines a substantially circular pivot hole 1442 in a middle portion of an end away from the fixing plate 142, and two pin holes 1444 in opposite sides of the pivot hole 1442.

The restricting member 15 is substantially ring-shaped and a central portion of the restricting member 15 defines a substantially circular through hole 152. A first end surface of the restricting member 15 defines two positioning grooves 154. Two slanted surfaces 1542 are formed on opposite inner side walls of each positioning groove 154. Two positioning poles 156 are formed on a second end surface of the restricting member 15 opposite to the first end surface. The positioning poles 156 engage in the pin holes 1444 of the fixing leaf 14.

Each limiting block 16 includes a resisting portion 162, a latching portion 164, and a positioning portion 166 extending from opposites ends of the resisting portion 162. The positioning portion 166 includes two slanted surfaces 1662 and a flat surface 1664 connecting the slanted surfaces 1662. The positioning portion 166 corresponds to the positioning groove 154 in the restricting member 15.

The deformable member 17 is substantially circular in shape, and includes a substantially circular base plate 172 and two protrusions 174 extending substantially perpendicularly from the base plate 172. An end surface of each protrusion 174 is substantially flat. A center portion of the deformable member 17 defines a non-circular through hole 176. The deformable member 17 defines two latching grooves 178 in the base plate 172 for receiving the latching portions 164 of the limiting blocks 16.

The washer 18 is substantially ring-shaped and a central portion of the washer 18 defines a non-circular through hole 182, so that the washer 18 can be non-rotatably sleeved on the shaft portion 126 of the pivot shaft 12.

The fastening member 19 may be a nut defining a threaded hole 192 to engage with the threaded portion 1264 of the pivot shaft 12. The fastening member 19 includes a friction portion 194 to resist the washer 18, thereby preventing the washer 18 from loosening on the pivot shaft 12. The friction portion 194 is formed by a plurality of friction protrusions (not labeled) extending from an end surface of the fastening member 19.

Referring to FIGS. 1 through 4, the positioning poles 156 are inserted into the pin holes 1444 of the fixing leaf 14, so that the restricting member 15 is non-rotatable relative to the fixing leaf 14. The latching portions 164 of the limiting blocks 16 are latched in the latching grooves 178 of the deformable member 17 and the positioning portion 166 of the limiting blocks 16 are received in the positioning grooves 154 of the restricting member 15. The shaft portion 126 of the pivot shaft 12 is passed through the through hole 132 of the friction member 13, the pivot hole 1442 of the fixing leaf 14, the through hole 152 of the restricting member 15, the through hole 176 of the deformable member 17, and the through hole 182 of the washer 18 in that order. The threaded portion 1264 of the pivot shaft 12 is screwed in the threaded hole 192 of the fastening member 19. The fixing head 124 of the pivot shaft 12 is inserted into the fixing hole 1142 of the rotatable leaf 11. Therefore, the rotatable leaf 11, the deformable member 17, and the washer 18 are non-rotatably connected to the pivot shaft 12. The fastening member 19 can be adjusted along the threaded portion 1264 of the pivot shaft 12.

When an external force is applied to the rotatable leaf 11, the rotatable leaf 11 rotates with the pivot shaft 12, the deformable member 17, and the washer 18 relative to the fixing leaf 14 and the restricting member 15. The positioning portion 166 of each limiting block 16 slides out of each positioning groove 154 along one of the slanted surfaces 1542, thus the resisting portion 162 presses the base plate 172 of the deformable member 17 such that the deformable member 17 becomes elastically deformed and applies an axial force effecting on the restricting member 15. The components sleeved on the shaft portion 126 of the pivot shaft 12 cooperatively create a friction because of the axial force, thus the rotatable leaf 11 can be held in any position due to the friction.

When the positioning portion 166 of each limiting block 16 slides out of each positioning groove 154, the axial force created by the deformable member 17 is relatively large. Thus, the friction created by the components sleeved on the shaft portion 126 of the pivot shaft 12 is relatively large. After repeated use, the friction remains large enough to hold the rotatable leaf 11 in any position. Thus, a usage life of the hinge assembly 100 is prolonged. When the limiting blocks 16 slides into the positioning grooves 154, the hinge assembly 100 is in a stable state and the axial force created by the deformable member 17 is greatly decreased or even eliminated. The deformable member 17 is slightly deformed, if at all, in the stable state. Thus, the deformable member 17 is not easily fatigued. Therefore, a usage life of the hinge assembly 100 is further prolonged.

It may be appreciated that the limiting blocks 16 may also be only one or more than two. The number of the positioning grooves 154 and the number of the latching grooves 178 may both be equal to the number of limiting blocks 16 or be twice as much as a mount of the limiting blocks 16. Thus, the hinge assembly 100 may be kept in several stable states. In addition, the limiting blocks 16 may be integrally formed with the deformable member 17. If the fixing head 124 of the pivot shaft 12 is directly fixed to the cover of the electronic device, the rotatable leaf 11 may be omitted. Lastly, an amount of the protrusions 174 of the deformable member 17 may be more than two.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A hinge assembly, comprising:
a pivot shaft;
a fixing leaf rotatably connected to the pivot shaft;
a restricting member rotatably sleeved on the pivot shaft and abutting the fixing leaf, the restricting member defining a positioning groove at an end surface thereon;
a deformable member non-rotatably sleeved on the pivot shaft, comprising a base plate and two protrusions extending substantially perpendicularly from an end surface of the base plate away from the restricting member, and the base plate of the deformable member defining a latching groove at another end surface thereon adjacent to the restricting member;
a limiting block partially received in the positioning groove and connected to the deformable member, wherein the limiting block comprises a resisting portion, a latching portion, and a position portion extending from opposites ends of the resisting portion; the positioning portion is received in the positioning groove, the latching portion is latched in the latching groove, and the resisting portion resists the base plate of the deformable member; when the pivot shaft is rotated, the limiting block slides out of the positioning groove to press the base plate of the deformable member such that the deformable member becomes elastically deformed and applies an axial force effecting on the restricting member; and
a fastening member fixed on an end of the pivot shaft to prevent the deformable member from moving along the pivot shaft.

2. The hinge assembly of claim 1, wherein the restricting member comprises two slanted surfaces formed in opposite inner side walls of each positioning groove; the positioning portion of the limiting block corresponds to the positioning groove and comprises two slanted surfaces for abutting the slanted surfaces of the restricting member.

3. The hinge assembly of claim 1, wherein the restricting member is non-rotatably connected to the fixing leaf.

4. The hinge assembly of claim 3, wherein the fixing leaf defines two pin holes; the positioning groove is defined in a first end surface of the restricting member, and two positioning poles are formed on a second end surface of the restricting member opposite to the first end surface; the positioning poles are inserted into the pin holes of the fixing leaf such that the restricting member is non-rotatable relative to the fixing leaf.

5. The hinge assembly of claim 1, further comprising a rotatable leaf non-rotatably connected to the pivot shaft.

6. The hinge assembly of claim 5, wherein the pivot shaft comprises a flange portion, a fixing head, and a shaft portion, the fixing head and the shaft portion extend from opposite ends of the flange portion; the rotatable leaf is fixed to the fixing head, and the shaft portion extends through the fixing leaf, the restricting member, and the deformable member.

7. The hinge assembly as claimed in claim 6, wherein a threaded portion is formed on a distal end of the shaft portion away from the flange portion, and the fastening member is a nut engaged with the threaded portion.

8. The hinge assembly of claim 7, further comprising a washer non-rotatably sleeved on the shaft portion and positioned between the fastening member and the deformable member; the fastening member comprising a friction portion to abut the washer.

9. The hinge assembly of claim 6, further comprising a friction member rotatably sleeved on the shaft portion and positioned between the flange portion and the fixing leaf.

10. A hinge assembly, comprising:
a pivot shaft;
a rotatable leaf non-rotatably connected to the pivot shaft;
a fixing leaf rotatably connected to the pivot shaft;
a restricting member rotatably sleeved on the pivot shaft and abutting the fixing leaf, the restricting member defining two positioning grooves at an end surface thereon;
a deformable member non-rotatably sleeved on the pivot shaft, and comprising a base plate and two protrusions extending substantially perpendicularly from an end surface of the base plate away from the restricting member, the base plate of the deformable member defining two latching grooves at another end surface thereon adjacent to the restricting member;
two limiting blocks partially received in the positioning grooves and connected to the deformable member, wherein each limiting block comprises a resisting portion, a latching portion, and a position portion extending from opposites ends of the resisting portion, the positioning portions are received in the positioning grooves, the latching portions are latched in the latching grooves, and the resisting portions resist the base plate of the deformable member, when the rotatable leaf is rotated, the limiting blocks slide out of the positioning grooves to press the base plate of the deformable member such that the deformable member becomes elastically deformed and applies an axial force effecting on the restricting member; and
a fastening member fixed on an end of the pivot shaft to prevent the deformable member from moving along the pivot shaft.

11. The hinge assembly of claim 10, wherein the restricting member comprises two slanted surfaces formed in opposite inner side walls of each positioning groove, the positioning portion of each limiting block corresponds to the positioning groove and comprises two slanted surfaces for abutting the slanted surfaces of the restricting member.

12. The hinge assembly of claim 10, the restricting member is non-rotatably connected to the fixing leaf.

13. The hinge assembly of claim 12, the fixing leaf defines two pin holes; the positioning grooves are defined in a first end surface of the restricting member, and two positioning poles are formed on a second end surface of the restricting member opposite to the first end surface; the positioning poles are inserted into the pin holes of the fixing leaf such that the restricting member is non-rotatable relative to the fixing leaf.

14. The hinge assembly of claim 10, wherein the pivot shaft includes a flange portion, a fixing head, and a shaft portion; the fixing head and the shaft portion extend from opposite ends of the flange portion; the rotatable leaf is fixed to the fixing head, the shaft portion extends through the fixing leaf, the restricting member, and the deformable member.

15. The hinge assembly as claimed in claim 14, wherein a threaded portion is formed on a distal end of the shaft portion away from the flange portion, and the fastening member is a nut engaged with the threaded portion.

16. The hinge assembly of claim 15, further comprising a washer non-rotatably sleeved on the shaft portion and positioned between the fastening member and the deformable member; the fastening member comprising a friction portion to abut the washer.

17. The hinge assembly of claim 14, further comprising a friction member rotatably sleeved on the shaft portion and positioned between the flange portion and the fixing leaf.

18. The hinge assembly of claim 14, wherein the rotatable leaf comprises a mounting portion and a connecting knuckle extending substantially perpendicularly from a side of the mounting portion, and the connecting knuckle defines a non-circular fixing hole; a cross-section of the fixing head perpendicular to the central axis of the fixing head corresponds to the shape of the fixing hole of the rotatable leaf, and the fixing head is inserted into the fixing hole of the rotatable leaf.

19. A hinge assembly, comprising:
a pivot shaft;
a fixing leaf rotatably connected to the pivot shaft;
a restricting member rotatably sleeved on the pivot shaft and abutting the fixing leaf, the restricting member defining a positioning groove;
a deformable member non-rotatably sleeved on the pivot shaft, comprising a base plate and at least two protrusions extending substantially perpendicularly from an end surface of the base plate away from the restricting member, and the base plate of the deformable member defining a latching groove penetrating through the base plate along a direction substantially parallel to an axis of the pivot shaft;
a limiting block partially received in the positioning groove and connected to the deformable member, wherein when the pivot shaft is rotated, the limiting block slides out of the positioning groove to press the base plate of the deformable member such that the deformable member becomes elastically deformed and applies an axial force effecting on the restricting member; and
a fastening member fixed on an end of the pivot shaft to prevent the deformable member from moving along the pivot shaft.

20. The hinge assembly of claim 1, wherein a size of the resisting portion is larger than that of the latching portion and the positioning portion.

* * * * *